March 5, 1963
F. G. BIRKHEAD
3,079,872
AUTOMATIC RELEASING DRIVE CARRIAGE FOR
POWER AND FREE CONVEYOR SYSTEMS
Filed Dec. 19, 1960
2 Sheets-Sheet 1
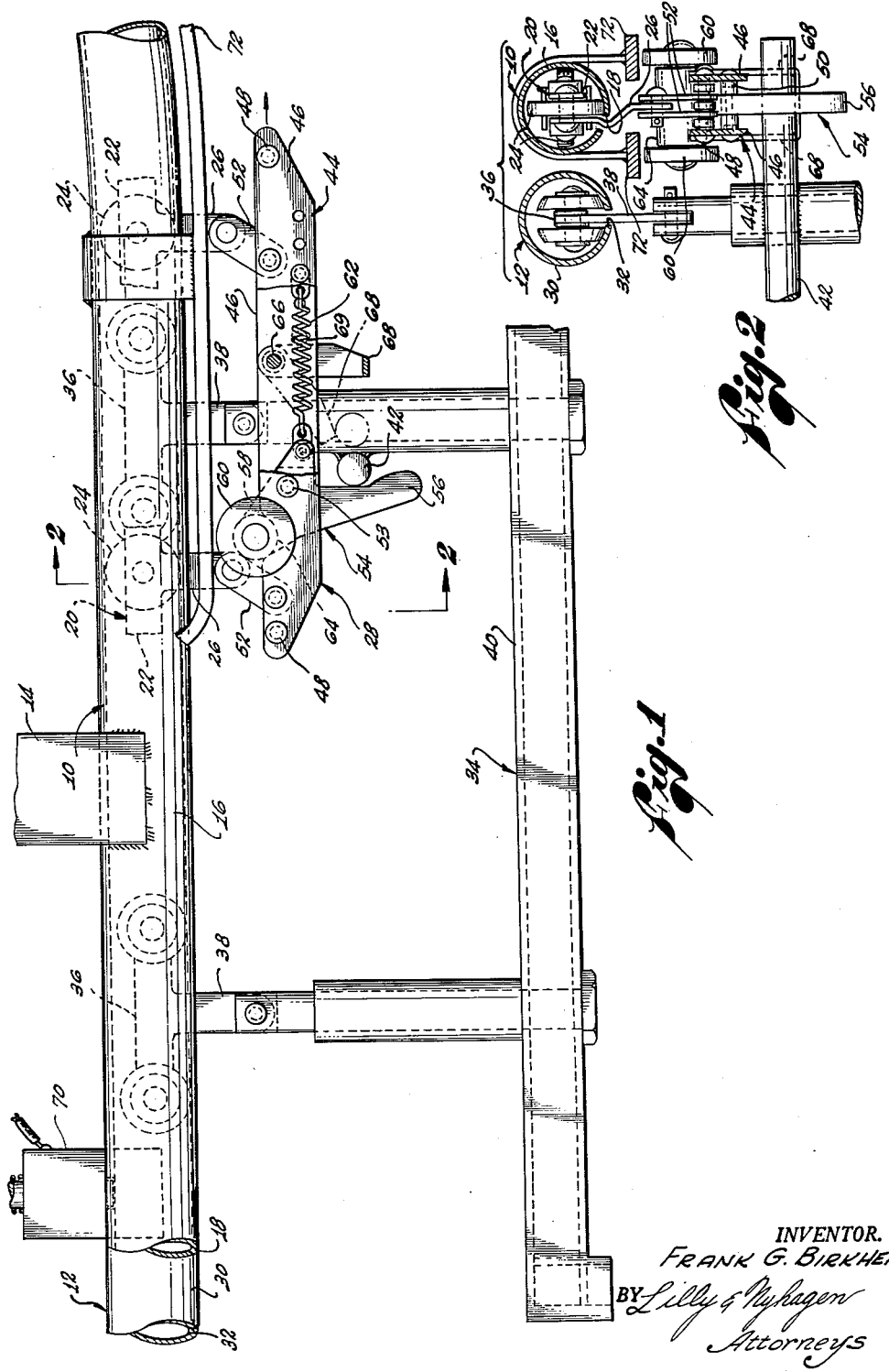
INVENTOR.
FRANK G. BIRKHEAD
BY Lilly & Nyhagen
Attorneys March 5, 1963
F. G. BIRKHEAD
3,079,872
AUTOMATIC RELEASING DRIVE CARRIAGE FOR
POWER AND FREE CONVEYOR SYSTEMS
Filed Dec. 19, 1960
2 Sheets-Sheet 2
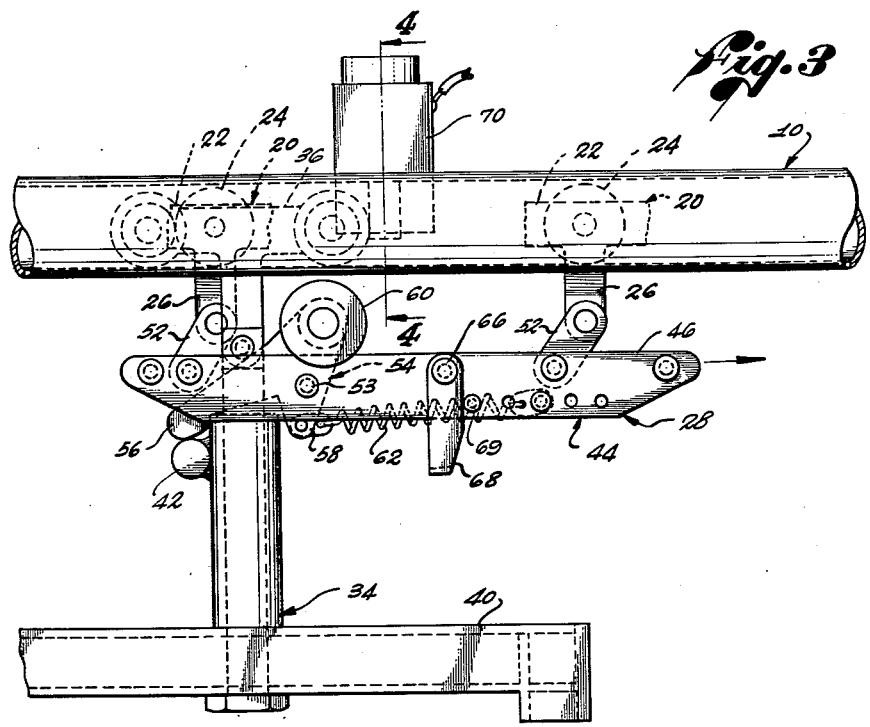
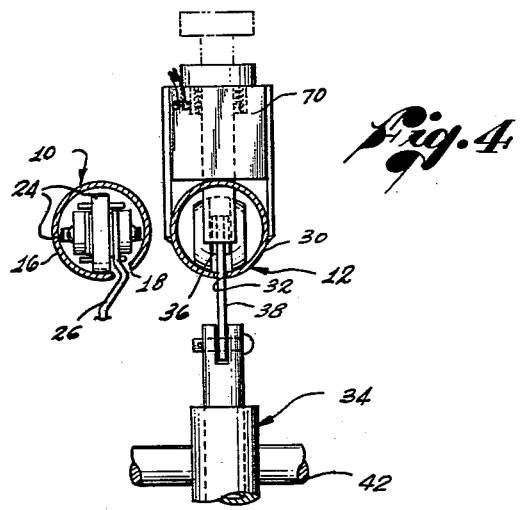
INVENTOR.
FRANK G. BIRKHEAD
BY
Lilly & Nyhagen
Attorneys United States Patent Office 3,079,872
Patented Mar. 5, 1963

3,079,872
AUTOMATIC RELEASING DRIVE CARRIAGE FOR POWER AND FREE CONVEYOR SYSTEMS
Frank G. Birkhead, Whittier, Calif., assignor to Chainveyor Corp., Los Angeles, Calif., a corporation of California
Filed Dec. 19, 1960, Ser. No. 76,960
7 Claims. (Cl. 104—172)

This invention deals generally with conveyor systems and, particularly, with an improved, automatic releasing drive carriage for so-called power and free overhead conveyor systems.

Power and free conveyor systems are well known in the art. These systems comprise, briefly, two parallel conveyor tracks, one the power track and the other the free track. Movably supported on the free track for free and independent movement therealong are carriers which are adapted to support the articles to be conveyed by the system. The power track is equipped with power driven conveyor means including, at spaced intervals, drive carriages which are driven along the power track by the conveyor means. The article carriers and drive carriages incorporate cooperating means whereby each carriage can be releasably coupled to an article carrier for moving the latter along the free track. The drive couplings between the drive carriages and article conveyors are releasable so that the latter can be left at selected stations along the free track while the carriages continue to travel along the power track.

In one existing type of power and free conveyor system of this character, remotely controllable, retractable stops are placed at selected positions along the free track. When extended, these stops are located in the path of movement of the article carriers along the free track. In this system, each drive carriage incorporates a carrier driving means which releases automatically, in response to engagement of an article carrier driven by the carriage with an extended stop, to free the carrier from the carriage. Successive drive carriages continue to move past the article carrier until the stop is retracted, whereupon the next following carriage will pick up the carrier and again convey the latter along the free track.

A general object of this invention is to provide an automatic releasing drive carriage of the character described for power and free conveyor systems.

A more specific object of the invention is to provide an automatic releasing drive carriage of the character described which is simple in construction, reliable in operation, inexpensive to manufacture, and otherwise ideally suited to its intended functions.

Other objects, advantages, and features of the invention will become readily apparent as the description proceeds.

The invention will be described in detail by reference to the attached drawings, wherein:

FIG. 1 is a side elevation of the present drive carriage installed in a power and free conveyor system;

FIG. 2 is a section taken on line 2—2 of FIG. 1;

FIG. 3 is a side elevation of the present drive carriage illustrating the manner in which an article carrier is released from the drive carriage; and FIG. 4 is a section taken on line 4—4 of FIG. 3.

In these drawings, the numeral 10 denotes the power track and the numeral 12 denotes the free track of a conventional power and free conveyor system. These tracks are suspended in an overhead position by means of hangers 14.

Power track 10 is composed of tubular sections 16 which are rigidly joined in coaxial, end-to-end fashion to form a continuous conveyor track. Tubular sections 16 have aligned, lower longitudinal slots 18. These slots are disposed in an axial plane of the tubular sections that is inclined at a small angle from the vertical, in the known way.

Within the power track is a power driven conveyor chain 20 comprising pivotally connected links 22. Centrally mounted on the conveyor chain at intervals therealong are supporting rollers 24 that ride on the inner surface of the power track as shown. Pendants 26 are pivotally attached to the conveyor chain 20 in line with certain of the rollers 24. These pendants extend through the track slots 18 and have a return bend as shown in FIG. 2 so that their lower end portions are vertically aligned with the adjacent rollers 24. Hingably mounted on adjacent pairs of the pendants 26, at intervals along the conveyor chain 20, are the present automatic releasing drive carriages 28, soon to be described.

The free track 12 also comprises tubular sections 30 which are rigidly joined in coaxial, end-to-end fashion. Sections 30 have aligned, lower longitudinal slots 32 directly below the center of the track. Movably supported on this track, for free and independent movement therealong, are article carriers 34.

Each carrier 34 comprises a pair of wheeled carriages 36 movably supported within the track and pendants 38 extending through the free track slot 32. Hingably supported on the lower ends of these pendants is a frame 40 for supporting the articles to be conveyed. A crossbar 42 is rigidly attached to the frame 40 and extends transversely into the path of movement of the drive carriages 28 along the power track.

The conveyor structure thus far described is conventional except for the present improved drive carriage 28. This improved drive carriage will now be described.

Each carriage comprises an elongate rigid frame 44. This frame is illustratively composed of two long, flat frame members 46 which are rigidly joined in spaced, parallel relationship by pins 48. A vertical, longitudinal slot 50 is thereby formed between the frame members 46. Hingably mounted on the frame 44, adjacent its ends and within the slot 50, are links 52. These links extend beyond the upper side of the carriage frame 44 and are pivotally attached to the adjacent pair of conveyor pendants 26. If desired, these links may embody swivel joints, not shown, having swivel axes normal to the pivot axes of the links in order to minimize bending of the parts. During operation of the conveyor system, frame 44 moves in the endwise direction indicated by the arrow in the drawings.

Pivotally supported by a pin 53 on the carriage frame 44, so as to swing on a transverse axis of the frame, is a carrier drive dog 54. This drive dog is positioned within the frame slot 50 and between the frame supporting links 52. One arm 56 of the drive dog extends beyond the lower side of the frame 44 so as to swing in the fore and aft direction of the frame during pivoting of the drive dog on the frame. The other arm 58 of the drive dog extends toward the upper side of the frame and mounts rollers 60 at its ends. As shown best in FIG. 2, these rollers are located outboard of the carriage frame and on a transverse axis of the frame. In FIG. 1, drive dog arm 58 will be observed to be inclined toward the rear end of the carriage frame with respect to arm 56.

A tension spring 62 is connected between the frame 44 and drive dog 54, at a point below the pivot axis of the dog, for urging the lower arm 56 of the dog in a forward direction. The upper edges of the frame act as a stop against which the bearing support 64 on the dog arm 58 is engageable to limit swinging of the dog in this direction to the position of FIG. 1 wherein the arm extends in a transverse direction of the frame. The dog is free to swing in the opposite direction, however.

Pivotally supported on the carriage frame 44, by means of a pin 66, so as to swing on a transverse axis of the frame, is a holdback member 68. This member is located just forwardly of the drive dog 54. The lower end of the holdback member extends a distance below the lower end of the frame so as to also swing in the fore and aft direction of the frame. A stop 69 on the frame limits forward swinging of the holdback member to its solid line position of FIG. 1. The holdback member is free to swing rearwardly to its phantom line position of FIG. 1.

The parts of the present drive carriage are proportioned so that the lower arm 56 of the drive dog 54 and the lower end of the holdback member are located at the level of the crossbar 42 on the article carrier 34.

In operation of the conveyor system, assume first that an article carrier 34 is stationary on the free track 12 and a drive carriage 28 is being advanced toward this stationary carrier by the power driven conveyor chain 20. When the drive carriage reaches the carrier, the crossbar 42 is initially engaged by the holdback member 68 on the carriage. This member swings rearwardly, as shown in FIG. 1, to permit the carriage to continue advancing past the carrier to a position where the lower arm 56 of the drive dog 54 on the carriage engages the crossbar 42. The tension of the dog biasing spring 62 is sufficient to restrain the arm 56 against swinging rearwardly under the action of the drag force exerted thereon by the carrier. Accordingly, the drive carriage drives the carrier 34 along the free track 12.

In power and free conveyor systems of this type, solenoid actuated stops or the like are placed in the free track 12 at selected stations along the system at which article carriers 34 may be temporarily left for loading, unloading or storage. Such a stop is shown at 70. These stops are located in the path of movement of the article carriers 34 along the free track. When a carrier engages a stop, further movement of the carrier is prevented while movement of the drive carriage continues. As a result, the arm 56 of the drive dog is forced rearwardly, against the action of the dog biasing spring 62, and the arm 56 rides over the carrier bar 42. The carrier is thereby released from the drive carriage which continues to move along the power track 10. Following drive carriages on the power driven conveyor chain 20 will, of course, continue to move past the carrier so long as the stop 70 is extended.

When it is desired to again advance the article carrier 34 along the free track 12, the stop 70 is retracted by energizing its solenoid. The next drive carriage 28 reaching the article carrier will then engage the latter in the manner described above and drive it along the free track. In this way, an article carrier may be picked up from or left at any selected station of the conveyor system.

In a typical power and free conveyor system, the conveyor tracks 10 and 12 will not be entirely horizontal. Rather, some parts of the tracks are usually inclined upwardly and other parts of the tracks are inclined downwardly, as shown in the drawing. The purpose of the holdback member 68 on the drive carriage 28 is to hold back an article carrier being driven by the drive carriage during movement of the latter along a downwardly inclined section of track.

During movement of the drive carriage and article carrier along an upwardly inclined section of track, the weight of the carrier creates an additional force on the drive dog 54 tending to rock the latter rearwardly against the action of its biasing spring 62. Accordingly, there is a possibility of the drive dog being forced rearwardly under these conditions sufficiently to release the carrier from the carriage. To prevent this accidental release of the carrier on upwardly inclined track sections, rails 72 are attached to these sections of the tracks against which the drive dog rollers 60 engage when the carriage is on an upwardly inclined track section. These rails restrain the drive dog 54 on the carriage against rearward rocking and thereby prevent accidental release of the carrier.

Clearly, therefore, the automatic releasing drive carriage herein described and illustrated is fully capable of attaining the objects and advantages preliminarily set forth.

What is claimed is:

1. A drive carriage for a power and free conveyor system of the character described, comprising an elongate frame, means on the frame to suspend the latter from the conveyor system for endwise movement of the frame in the system, a dog pivoted on the frame on a transverse axis of the frame and having an arm extending beyond one side of the frame in a transverse plane of said pivot axis, whereby said arm swings in the endwise direction of the frame during pivoting of the dog on the frame, a spring connected between said frame and dog for urging the latter in one pivotal direction in which said arm swings toward one end of the frame, a stop on the frame to limit pivoting of the dog in said one pivotal direction to a position wherein said arm extends transversely of the frame, a holdback member pivoted on the frame between said dog and said one end of the frame on an axis approximately parallel to said first-mentioned pivot axis and having an arm extending beyond said one side of the frame in a transverse plane of the pivot axis of the member, whereby said latter arm swings in the endwise direction of the frame during pivoting of the member on the frame, and a stop on the frame to limit swinging of the member in the direction in which said latter arm swings toward said one end of the frame and to a position in which said latter arm extends transversely of the frame.

2. A drive carriage for a power and free conveyor system of the character described, comprising an elongate frame, means on the frame to operatively connect the latter in the conveyor system for endwise movement of the frame in the system, a dog pivoted intermediate its ends on the frame on a transverse axis of the frame and having one arm of the dog extending beyond one side of the frame in a transverse plane of said pivot axis, whereby said arm swings in the endwise direction of the frame during pivoting of the dog on the frame, the other arm of the dog extending toward the opposite side of the frame, a roller on said other arm which projects beyond said other side of the frame, a spring connected between said frame and dog for urging the latter in one pivotal direction in which said one arm swings toward one end of the frame, a stop on the frame to limit pivoting of the dog in said one pivotal direction to a position wherein said one arm extends transversely of the frame, a holdback member pivoted on the frame between said dog and said one end of the frame on an axis approximately parallel to said first-mentioned pivot axis and having an arm extending beyond said one side of the frame in a transverse plane of the pivot axis of the member, whereby said latter arm swings in the endwise direction of the frame during pivoting of the member on the frame, and a stop on the frame to limit swinging of the member in the direction in which said latter arm swings toward said one end of the frame and to a position in which said latter arm extends transversely of the frame.

3. The subject matter of claim 2 wherein said arms of the dog are angularly disposed and said other arm inclines toward the other end of the frame with respect to said one arm of the dog.

4. A drive carriage for a power and free conveyor system of the character described, comprising an elongate rigid frame having a slot in a longitudinal plane of the frame and opening through opposite sides of the frame, links within said slot adjacent opposite ends of the frame, respectively, and extending beyond one side of the frame, means pivotally supporting each link on the frame on an axis normal to said plane, a dog within said slot between said links, means pivotally supporting said dog on the frame on an axis normal to said plane and located intermediate the ends of the dog, said dog having one arm extending toward said one side of the frame and another arm extending beyond the opposite side of the frame, said one arm being inclined toward one end of the frame with respect to said other arm, a roller on the end of said one arm projecting beyond said one side of the frame, a spring acting between said frame and dog for urging the latter in a direction in which said other arm swings toward the other end of the frame, a stop on the frame to limit pivoting of the dog in said latter direction to a position wherein said other arm extends transversely of the frame, a holdback member between said dog and said other end of the frame, means pivotally supporting said member on the frame on an axis normal to said plane, one end of said member extending beyond said opposite side of the frame, and a stop on said frame to limit swinging of said end of the member toward said other end of the frame to a position wherein the member extends transversely of the frame.

5. In a power and free conveyor system, the combination of two parallel conveyor tracks having upwardly inclined sections, a drive carriage movable along one track, means for driving said carriage along said one track, an article supporting carriage movable along the other track, one of said carriages including a rigid elongate frame and means supporting each end of the frame on the respective conveyor track, a drive dog on said frame, the other carriage including a member engageable with said dog to form a driving connection between said carriages, whereby said article carriage is driven along its track by said drive carriage, said member exerting a force on said dog during driving of said article carriage by said drive carriage, means mounting said dog on said frame for movement under the action of said force from a drive position wherein the dog is disposed for driving engagement with the member to a released position wherein said dog clears said member to disengage said article carriage from said drive carriage, a spring acting between said frame and dog for resiliently urging the latter to said drive position, and coacting means on said dog and on said inclined section of one track for preventing movement of said dog to said released position while said one carriage is on the inclined section of its respective track.

6. In a power and free conveyor system, the combination of two parallel conveyor tracks having upwardly inclined sections, a drive carriage movable along one track, means for driving said carriage along said one track, an article supporting carriage movable along the other track, said drive carriage including a rigid elongate frame and means supporting each end of the frame on the respective conveyor track, a drive dog on said frame, said article carriage including a member engageable with said dog to form a driving connection between said carriages, whereby said article carriage is driven along its track by said drive carriage, said member exerting a force on said dog during driving of said article carriage by said drive carriage, means mounting said dog on said frame for movement under the action of said force from a drive position wherein the dog is disposed for driving engagement with the member to a released position wherein said dog clears said member to disengage said article carriage from said drive carriage, a spring acting between said frame and dog for resiliently urging the latter to said drive position, and coacting means on said dog and on said inclined section of said one track for preventing movement of said dog to said released position while said drive carriage is on the inclined section of its respective track.

7. In a power and free conveyor system, the combination of two parallel conveyor tracks arranged side by side and including upwardly inclined sections, power driven conveyor means comprising a drive carriage movably supported by one track and including a pair of pendants depending below said one track at positions spaced therealong, a rigid frame extending between and secured to the lower ends of said pendants, a drive dog pivoted intermediate its ends on said frame with one end of the dog depending below the frame and the other end of the dob projecting above the frame, an article supporting carriage movably supported on the other track, a member rigid on said article carriage and extending into the path of movement of said one end of the drive dog when the latter occupies a given drive position on said frame, whereby said drive dog is engageable with said member to drive said carriage along its track, the driving force of said member against said dog tending to pivot the latter to a released position in which said one end of the dog clears said member to release the article carriage from said drive carriage, a spring connected between said frame and dog for urging the latter to its drive position, and a rail on said inclined section of said one track engageable with said other end of said dog while said drive carriage is on said latter section for preventing said dog from pivoting to said released position thereof.

References Cited in the file of this patent
UNITED STATES PATENTS

| | | |
|---|---|---|
| 797,610 | Schaefer | Aug. 22, 1905 |
| 2,510,318 | Rose | June 6, 1950 |
| 2,572,011 | Cohen et al. | Oct. 23, 1951 |
| 2,619,916 | Rainier | Dec. 2, 1952 |
| 2,883,942 | Johnson | Apr. 28, 1959 |
| 2,885,969 | Kay et al. | May 12, 1959 |
| 2,956,514 | Bishop | Oct. 18, 1960 |